T. C. HAYS.
ESCAPEMENT.
APPLICATION FILED MAY 23, 1912.
1,051,886.
Patented Feb. 4, 1913.
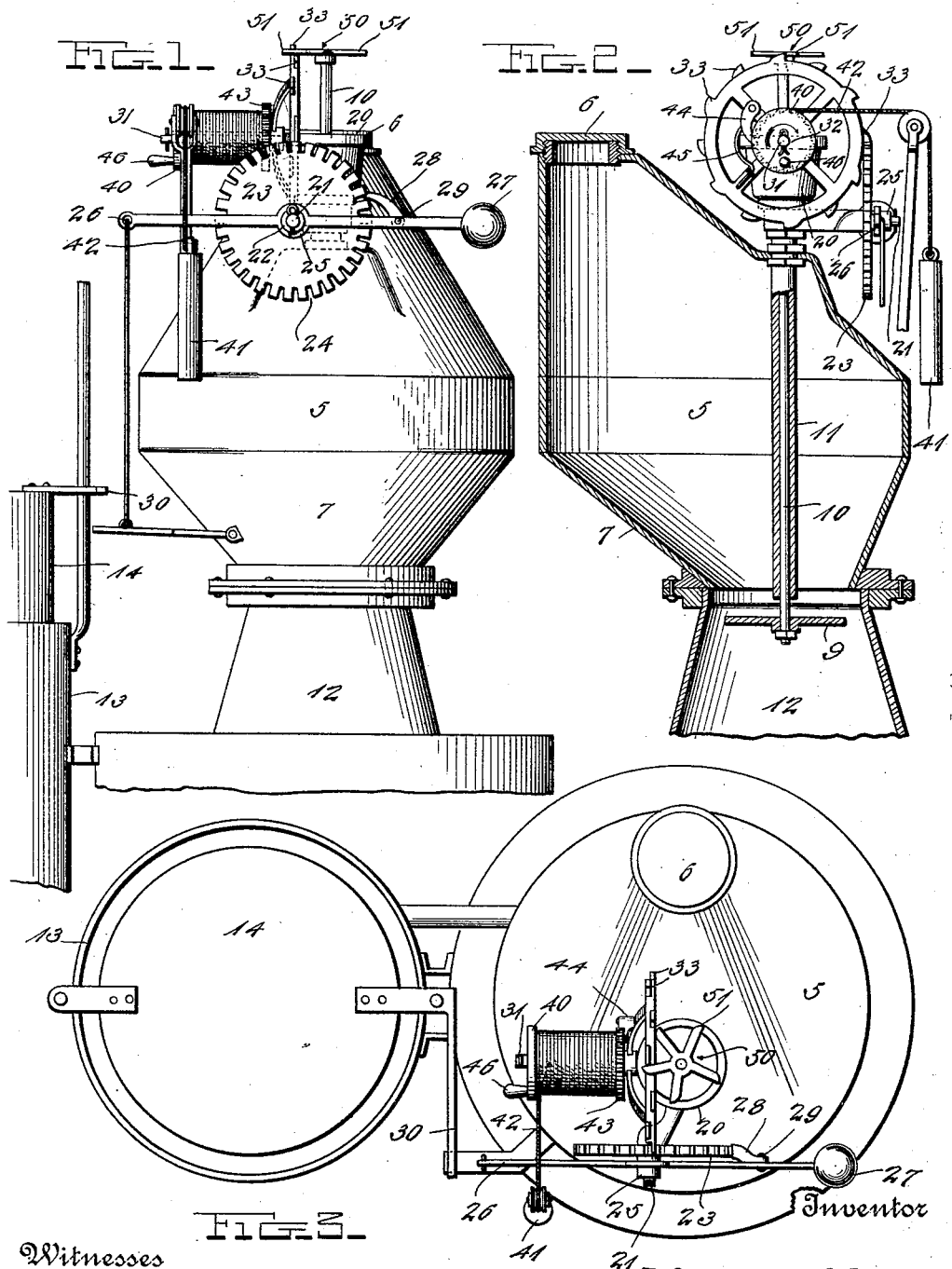

UNITED STATES PATENT OFFICE.

THOMAS C. HAYS, OF EMMITSBURG, MARYLAND.

ESCAPEMENT.

1,051,886.  Specification of Letters Patent.  Patented Feb. 4, 1913.

Application filed May 23, 1912. Serial No. 699,275.

*To all whom it may concern:*

Be it known that I, THOMAS C. HAYS, a citizen of the United States, residing at Emmitsburg, in the county of Frederick and State of Maryland, have invented certain new and useful Improvements in Escapements; and I do declare the following to be a full, clear, and exact description of the invention, such as will enable others skilled in the art to which it appertains to make and use the same.

This invention is an escapement, the object being to produce an improved device whereby an upright shaft may be turned intermittently through an escapement mechanism whose operation is controlled by the rise and fall of a member. The latter in the present case is the bell of a gasometer, and the upright shaft carries a plate or disk which serves for the purpose of spreading carbid crystals, causing them to drop into water so that they are slackened and gas given off whereby it accumulates under the bell of the gasometer which of course rises as gas increases and descends as the consumption increases. But I do not wish to be limited to this specific use of the mechanism hereinafter described and claimed, and shown in the drawings wherein—

Figure 1 is an elevation of this device complete; Fig. 2 is an elevation taken from the left side of Fig. 1 and showing the hopper in section and omitting the gasometer and bell; Fig. 3 is a plan view.

In the drawings the numeral 5 designates a hopper for containing carbid crystals, the same being filled through an opening at the top closed by a cap 6, and its lower walls converging as at 7 to a mouth-piece, some little distance beneath which is disposed a spreader plate or disk 9 mounted fast on the lower end of an upright shaft 10 which extends through a tube 11 within the hopper and rises through the upper end of the same.

It is the purpose of the present invention to provide an escapement mechanism whereby this shaft 10 will be turned intermittently so that the spreader plate which supports the bulk of the carbid crystals within the hopper 5, may also be turned step by step to cause some of the crystals to fall off the same into the water (not shown) with which the generating chamber 12 is partly filled, resulting in the creation of gas which rises within the gasometer 13 and raises the bell 14 as the gas increases, the bell descending as the consumption increases in a well known manner.

Coming now more particularly to the details of the present invention, as applied in this use thereof, the tube 11 is continued through the top of the hopper 5 and carries a bracket 20 having a horizontally projecting stub shaft 21 on which is mounted the hub 22 of a wheel 23 notched at its periphery as at 24 for a purpose to appear, and on this hub is journaled a bearing 25 at about the mid-length of a lever 26 having a weight 27 at one extremity, and adjacent the same a pawl 28 pivoted to the lever at 29 with its tip adapted to engage the notches of said wheel. The other extremity of this lever is adapted to be depressed by a finger 30 projecting from the bell 14 of the gasometer when the latter descends—thereby raising the weight and the pawl and turning the wheel in a manner which will be clear; but as the bell rises the weight will cause the lever to turn in the opposite direction, and the tip of the pawl will slide idly over the notches in the wheel as shown. Mounted on a second stub shaft 31 projecting horizontally from said bracket and at right angles to the first stub shaft, is the hub 32 of an escapement wheel whose teeth 33 are disposed in alternated or staggered relation to each other and in two planes around the periphery of this wheel, and the disposition of the latter on its shaft is such that as the escapement wheel rotates the teeth (which are ratchet-shaped as shown) come successively in contact with the edge of the notched wheel so that the latter arrests the movement of the escapement wheel. But when the notched wheel is turned a little, the tooth resting upon its edge may pass through one of its notches, and the escapement wheel is thus permitted to turn so the next tooth above strikes upon the edge of the wheel between its notches.

The hub of the escapement wheel is elongated, and journaled thereon is a drum 40 rotated in the direction of the arrow by any suitable means, as for instance by the weight 41 and cord 42 shown in the drawings; and this drum is connected with the escapement wheel by means of a ratchet 43 on the inner head of the drum and a pawl 44 pivoted to one of the spokes of the escapement wheel and pressed into engagement with the ratchet by means of a spring 45. The outer end of the drum carries a handle 46 by which it may be wound when the weight has run down. I do not wish to limit myself to this specific form of driving mechanism, however, as it is obvious that any approved means may be employed for imparting a constant energy to the escapement wheel to turn in the direction indicated, as it is only necessary that the flat ends of the ratchet-shaped teeth on the escapement wheel shall move toward the edge of the notched wheel, and pass through the notches therein when said notched wheel is turned as described.

While any suitable operative connection may be established between the rotating escapement wheel and the upright shaft 10, I prefer to employ a star wheel 50 secured to the upper end of the shaft with its fingers 51 passing between the teeth of the escapement wheel as shown. The result is that when the escapement wheel is turned intermittently in the manner above described, the star wheel also is turned, and its revolution turns the shaft 10 and the latter performs the work, whatever it is. In the present instance—as above stated—I have shown my improved mechanical movement as applied to a gas generator, and the intermittent rotation of the shaft feeds the carbid crystal into the generating chamber 12 with the results set forth. However, it will be clear that this escapement mechanism may have a great variety of uses, so long as some vertically movable member such as the bell 14 in the present case has a member which contacts it with the lighter end of the lever to move the notched wheel.

The parts are of the desired sizes, shapes, proportions and materials, and changes in details may be made without departing from the principle of the invention.

What is claimed as new is:—

1. In an escapement, the combination with a wheel standing in an upright plane and notched in its periphery, a pivoted lever moving adjacent said wheel, a pawl on the lever engaging its notches, means for moving the lever to retract the pawl, and a movable member adapted to move the lever in the opposite direction; of an escapement wheel standing in an upright plane at angles to said first-mentioned plane and having ratchet-shaped teeth on its periphery disposed in staggered relation to each other and adapted to contact with the edge of said notched wheel, driving mechanism for normally turning said escapement wheel in one direction, and driven mechanism actuated by the turning of this wheel.

2. In an escapement, the combination with a wheel standing in an upright plane and notched in its periphery, a pivoted lever moving adjacent said wheel, a pawl on the lever engaging its notches, means for moving the lever to retract the pawl, and a movable member adapted to move the lever in the opposite direction; of an escapement wheel standing in an upright plane at angles to said first-mentioned plane and having ratchet-shaped teeth on its periphery disposed in staggered relation to each other and adapted to contact with the edge of said notched wheel, a drum mounted loosely on the hub of said escapement wheel, ratchet mechanism connecting said wheel and drum, a handle on the latter, a weight, a cord leading from the weight around said drum, and driven mechanism actuated by the rotation of the escapement wheel.

3. In an escapement, the combination with a wheel standing in an upright plane and notched in its periphery, a pivoted lever moving adjacent said wheel, a pawl on the lever engaging its notches, means for moving the lever to retract the pawl, and a movable member adapted to move the lever in the opposite direction; of an escapement wheel standing in an upright plane at angles to said first-mentioned plane and having ratchet-shaped teeth on its periphery disposed in staggered relation to each other and adapted to contact with the edge of said notched wheel, driving mechanism for normally turning said escapement wheel in one direction, an upright shaft journaled alongside said escapement wheel, and a star wheel secured on the shaft with its fingers passing between the teeth of the escapement wheel, for the purpose set forth.

4. In an escapement, the combination with a wheel standing in an upright plane and notched in its periphery, a vertically movable member adjacent this wheel, and means for turning the latter when the member moves in one direction; of an escapement wheel standing in an upright plane at angles to said first-mentioned plane and having ratchet-shaped teeth on its periphery disposed in staggered relation to each other and adapted to contact with the edge of said notched wheel, driving mechanism for normally turning said escapement wheel in one direction, an upright shaft journaled alongside said escapement wheel, and a star wheel secured on the shaft with its fingers passing between the teeth of the escapement wheel, for the purpose set forth.

5. The herein described escapement comprising a wheel rotating in one plane and having radial notches in its periphery, means for turning this wheel intermittently, a second wheel standing in a plane at right angles to the first plane and having teeth on its periphery arranged in two planes and in staggered relation to each other, each adapted to contact with the edge of the first-named wheel between notches or to drop into and turn out a notch when the first-named wheel is turned, means imparting a constant tendency to the last-named wheel to turn, a driven shaft, and a star wheel fast thereon with its fingers engaged with said teeth, as and for the purpose set forth.

In testimony whereof I have hereunto set my hand in presence of two subscribing witnesses.

THOMAS C. HAYS.

Witnesses:
 JOHN A. HORNER,
 A. A. HORNER.